R. F. CORDERO.
VEHICLE SUSPENSION.
APPLICATION FILED JUNE 13, 1911. RENEWED FEB. 14, 1913.
1,073,797.  Patented Sept. 23, 1913.
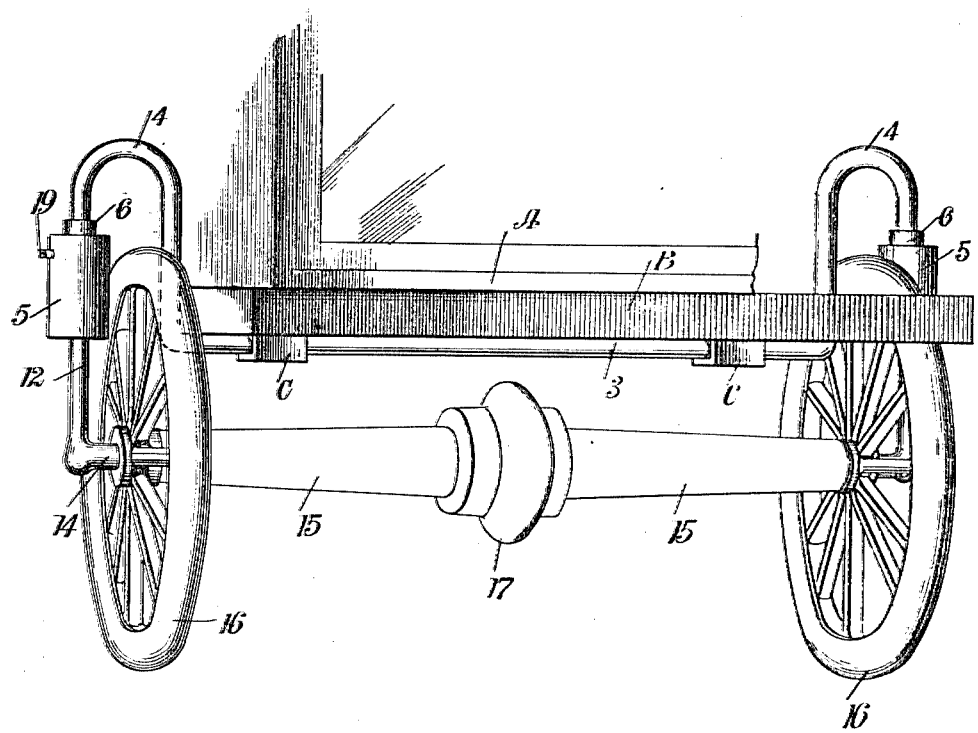
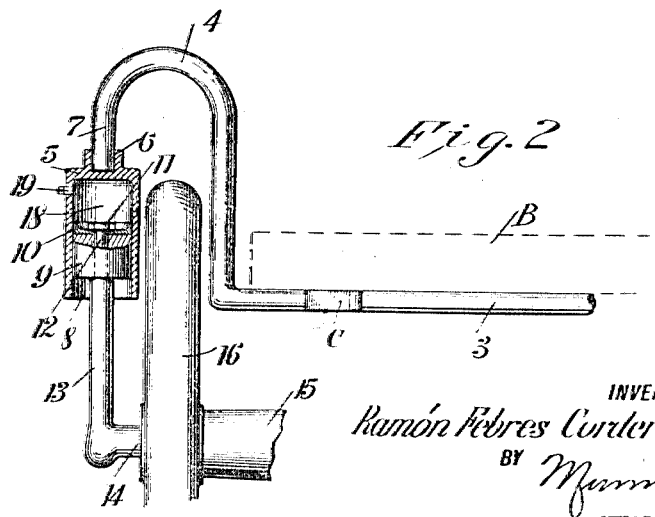
WITNESSES
INVENTOR
Ramón Febres Cordero
BY
ATTORNEYS

UNITED STATES PATENT OFFICE.

RAMÓN FEBRES CORDERO, OF RUBIO, VENEZUELA.

VEHICLE SUSPENSION.

1,073,797. Specification of Letters Patent. Patented Sept. 23, 1913.

Application filed June 13, 1911, Serial No. 632,886. Renewed February 14, 1913. Serial No. 748,467.

*To all whom it may concern:*

Be it known that I, RAMÓN FEBRES CORDERO, a citizen of the Republic of Venezuela, and a resident of Rubio, in the State of Tachira, Venezuela, have invented a new and Improved Vehicle Suspension, of which the following is a full, clear, and exact description.

My invention relates to a new and improved form of vehicle suspension and is particularly adapted to automobiles and light running road vehicles.

An object of my invention is to dispense with the spring suspension now in common use, and to substitute therefor, a suspension depending upon the resiliency of a compressed fluid to take up shocks and vibrations, and to prevent the same from being transmitted to the body of the vehicle. I attain the above outlined object by forming each end of a frame into an inverted U, positioning on the free end of the inverted U a compressed air cylinder, the piston of which cylinder is formed into a bearing to support the wheel.

With the above and other objects in view, as will more fully hereinafter appear, the present invention consists in certain novel details of construction and arrangement of parts hereinafter fully described, illustrated in the accompanying drawings, and more particularly pointed out in the appended claims.

Reference is to be had to the accompanying drawings forming a part of this specification, in which similar characters of reference indicate corresponding parts in both the figures, and in which—

Figure 1 is a perspective view of the rear end of an automobile showing a preferred embodiment of my invention attached thereto; and Fig. 2 is an enlarged detailed perspective view partly in section, showing one side of the suspension.

Described more in detail, I have shown a vehicle A, from beneath the framework B of which depends brackets C. Disposed in each bracket is a supporting frame 3 extending transversely across the body of the vehicle A. Beyond the side of the vehicle, each end of the frame 3 is bent upward in the form of a U 4, the outside free end of the U having rigidly depending therefrom, a cylinder 5, the upper end of which has a boss 6 in screw-threaded engagement with the end 7 of the frame 3. The lower end 8 of each cylinder is open, into which open end is slidably mounted a piston head 9 completely closing the inner bore of the cylinder 5. The upper inner end of the head 9 has mounted thereon a packing 10, bearing upon which packing is the head 11 of a piston rod 12, which rod is enlarged below the head 9, as shown at 13. The lower ends of the enlarged portions of the piston rods 12 are bent inwardly to form an axle 14, which axle extends across the framework parallel to the frame 3. Surrounding the axle 14 is a cylindrical sleeve 15, the opposite ends of which are rigidly attached to the traction wheels 16, the sleeve 15 and wheels 16 being actuated by means of any suitable driving mechanism 17. The upper portion of these wheels extend into the U 4, thereby firmly bracing the wheels into position.

The chamber 18 within the cylinder 5 is filled with compressed air through the port 19, which compressed air will react on the piston head 9, to support the weight of the vehicle. Should the wheels 16 come to a depression in the road, the compressed air will permit the wheels to drop into the depression, expanding the air in the chamber 18, thereby permitting the body of the vehicle to gradually drop, compressing the air in the chamber 18 until the weight of the vehicle is equal to the compressed force of the air. Should the wheels 16 meet a raised portion in the road, the effect will be to force the piston head 9 into the chamber 18, thereby suddenly compressing the air, and the compressed air tending to slowly raise the body of the vehicle.

While a preferred embodiment of the invention has been described, it is to be understood that many changes could be made in the above construction and many apparently widely different embodiments of this invention could be made without departing from the scope thereof. It is intended that all matters contained herein in the above description or shown in the accompanying drawings, shall be interpreted as illustrative and not in a limiting sense. It is also to be understood that the language used in the following claims is intended to cover the full scope of the invention and is not to be given any narrower construction than the prior art demands, and that materials, sizes and proportions of parts are non-essential, except as called for in the claims,

Having thus described my invention, I claim as new and desire to secure by Letters Patent:

1. In a vehicle suspension, a frame extending transversely across the body of the vehicle and rigidly attached thereto, each end of the frame beyond the body being in the form of an inverted U, an open ended cylinder depending from each of the free ends of said frame and rigidly connected therewith, an axle disposed below and parallel with said frame, a piston head movable in each cylinder, said cylinders containing a compressed fluid cushioning the movements of said heads, a piston rod attached to each of said heads and extending through said open ends of the cylinders, said rods extending at right angles from and integral with each end of said axle, a pair of wheels rotatably mounted on said axle, said pistons and cylinders forming the sole connection between the framework and wheels, one of said wheels disposed in each U, and a sleeve surrounding said auxiliary axle and rigidly connecting said wheels.

2. In a vehicle suspension, a frame extending transversely across the body of the vehicle and rigidly attached thereto, each end of the frame beyond the body being in the form of an inverted U, an open ended cylinder depending from each of the free ends of said frame and rigidly connected therewith, an axle disposed below and parallel with said frame, a piston head movable in each cylinder, said cylinders containing a compressed fluid cushioning the movements of said heads, a piston rod attached to each of said heads and extending through said open ends of the cylinders, said rods extending at right angles from and integral with each end of said axle, and a pair of wheels rotatably mounted on said axle, said piston and cylinder forming the sole connection between said vehicle and wheels, one of said wheels disposed in each U.

In testimony whereof I have signed my name to this specification in the presence of two subscribing witnesses.

RAMON FEBRES CORDERO.

Witnesses:
 JULIAN A. ARROYO,
 W. S. ORTON.